United States Patent

Udagawa

[11] Patent Number: 5,306,023
[45] Date of Patent: Apr. 26, 1994

[54] CYLINDER HEAD GASKET WITH AUXILIARY SEALING PLATE

[75] Inventor: Tsunekazu Udagawa, Ichikawa, Japan

[73] Assignee: Ishikawa Gasket Co., Ltd., Tokyo, Japan

[21] Appl. No.: 756,239

[22] Filed: Sep. 10, 1991

[51] Int. Cl.⁵ .............................................. F16J 15/12
[52] U.S. Cl. .................................. 277/235 B; 277/232
[58] Field of Search .............. 277/231, 232, 233, 234, 277/235 B, 236

[56] References Cited

U.S. PATENT DOCUMENTS

| | | | |
|---|---|---|---|
| 1,793,423 | 2/1931 | Fitzgerald | 277/232 |
| 1,846,402 | 2/1932 | Oven | 277/235 B X |
| 1,903,990 | 8/1933 | Fitzgerald | 277/232 X |
| 1,911,226 | 5/1933 | Fitzgerald | 277/232 X |
| 1,957,798 | 5/1934 | Oven | 277/231 |
| 2,130,110 | 9/1938 | Victor et al. | 277/232 |
| 2,157,102 | 5/1939 | Victor et al. | 277/235 B X |
| 3,549,157 | 12/1970 | Von Bennigsen | 277/233 X |
| 4,662,643 | 5/1987 | Rosenquist | 277/235 B |
| 4,711,456 | 12/1987 | Udagawa | 277/235 B |
| 4,776,073 | 10/1988 | Udagawa | 277/235 B X |
| 4,998,741 | 3/1991 | Udagawa | 277/235 B |

Primary Examiner—William A. Cuchlinski, Jr
Assistant Examiner—DePumpo
Attorney, Agent, or Firm—Kanesaka & Takeuchi

[57] ABSTRACT

A cylinder head gasket of the invention is formed of a main plate extending substantially throughout the entire area of the gasket, sealing devices formed around the cylinder bores, and at least one auxiliary plate laminated over the main plate. The auxiliary plate is situated at least in an intermediate area of the main plate surrounded between the two adjacent holes corresponding to the cylinder bores. The auxiliary plate includes two edge portions extending at least partly along the cylinder bores adjacent the intermediate area, a base portion between the two edge portions, and two turning portions laminated over the respective edge portions. When the gasket is tightened, the edge portions and the turning portions provide high surface pressure around the cylinder bores. Accordingly, leakage of gas at the intermediate area is prevented.

7 Claims, 2 Drawing Sheets

CYLINDER HEAD GASKET WITH AUXILIARY SEALING PLATE

BACKGROUND OF THE INVENTION AND RELATED ART STATEMENT

The present invention relates to a cylinder head gasket with an auxiliary sealing plate around cylinder bores for securely sealing therearound.

An automobile engine has been developed to provide high power with light weight. In order to satisfy this demand, an aluminum alloy has been used for a cylinder block as well as a cylinder head. Also, the distance between the cylinder bores is set as short as possible, and combustion pressure is increased.

Under the circumstances, high temperature and high pressure are applied to the cylinder head, especially to portions between the cylinder bores. These high pressure and high temperature are also applied to a gasket situated between the cylinder head and the cylinder block.

A gasket is provided with sealing means, such as a bead, a grommet and the like, for sealing around the cylinder bores. When the gasket is tightened, the sealing means is compressed to provide surface pressure thereat, by which areas around the cylinder bores are sealed.

In case a gasket is formed of a flexible material, such as a mixture of carbon or inorganic fibers and binders, such a flexible material is not strong against high temperature. In case a gasket is a steel laminate gasket formed of a plurality of steel plates, although the steel laminate gasket is generally strong against high temperature and high pressure, if extremely high temperature and high pressure are applied to the steel laminate gasket or the gasket is used for a long period of time, creep relaxation may occur. Also, decrease of surface pressure is liable to occur at the areas between the cylinder bores, to which high temperature and high pressure are applied.

Namely, in a conventional gasket, in case high temperature and high pressure are applied at the areas between the cylinder bores, leakage may happen around the cylinder bores.

In order to provide high surface pressure at a specific area, a surface pressure regulation plate may be installed on a gasket, as disclosed in U.S. Pat. No. 4,776,073. However, even if the conventional surface pressure regulation plate is used, the desired local surface pressure may not be obtained. Also, since the conventional surface pressure regulation plate is made separately, it is troublesome to provide a plurality of the conventional surface pressure regulation plates in one gasket.

In French Patent No. 2,521,638, a gasket is formed of a plurality of metal plates, wherein some plates extend partly around areas to be sealed. However, it does not locally provide high surface pressure.

Accordingly, one object of the present invention is to provide a cylinder head gasket for securely sealing around the cylinder bores.

Another object of the invention is to provide a cylinder head gasket as stated above, wherein high surface pressure is locally formed at an area between the cylinder bores situated adjacent to each other.

A further object of the invention is to provide a cylinder head gasket as stated above, which can be easily and economically manufactured.

Further objects and advantages of the invention will be apparent from the following description of the invention.

SUMMARY OF THE INVENTION

In accordance with the present invention, a cylinder head gasket is formed of a main plate extending substantially throughout the entire area of the engine, sealing means formed around cylinder bores for sealing therearound, and at least one auxiliary plate laminated over the main plate. The auxiliary plate is situated at least in an intermediate area of the main plate surrounded between two holes situated adjacent to each other. The holes of the main plate correspond to the cylinder bores of the engine.

The auxiliary plate is provided with two edge portions extending at least partly along the respective cylinder bores near the intermediate area, a base portion extending between the two edge portions, and two turning portions laminated over the respective edge portions to abut thereto. Namely, the turning portion is bent along the cylinder bore from the edge portion and is piled over the edge portion without a substantial space therebetween.

When the gasket is tightened, the edge portions and the turning portions provide high surface pressure around the cylinder bores. Namely, since a non-compressible thick portion is formed around the cylinder bore by the edge portion and the turning portion, high surface pressure is obtained around the cylinder bore. Therefore, locally high surface pressure is obtained at the intermediate area between the cylinder bores, so that leakage of combustion gas from the cylinder bores is effectively prevented.

The edge portions and the turning portions may extend entirely around the respective cylinder bores to provide high surface pressure equally around the cylinder bores. In case three or more cylinder bores are linearly arranged, the auxiliary plates are integrally connected together to form one unit.

In case the sealing means are beads or wire rings situated around the cylinder bores, the edge portions and the turning portions are directly laminated over the beads or wire rings. As a result, strong surface pressure is obtained around the cylinder bores.

DETAILED DESCRIPTION OF PREFERRED EMBODIMENTS

Figure 1:
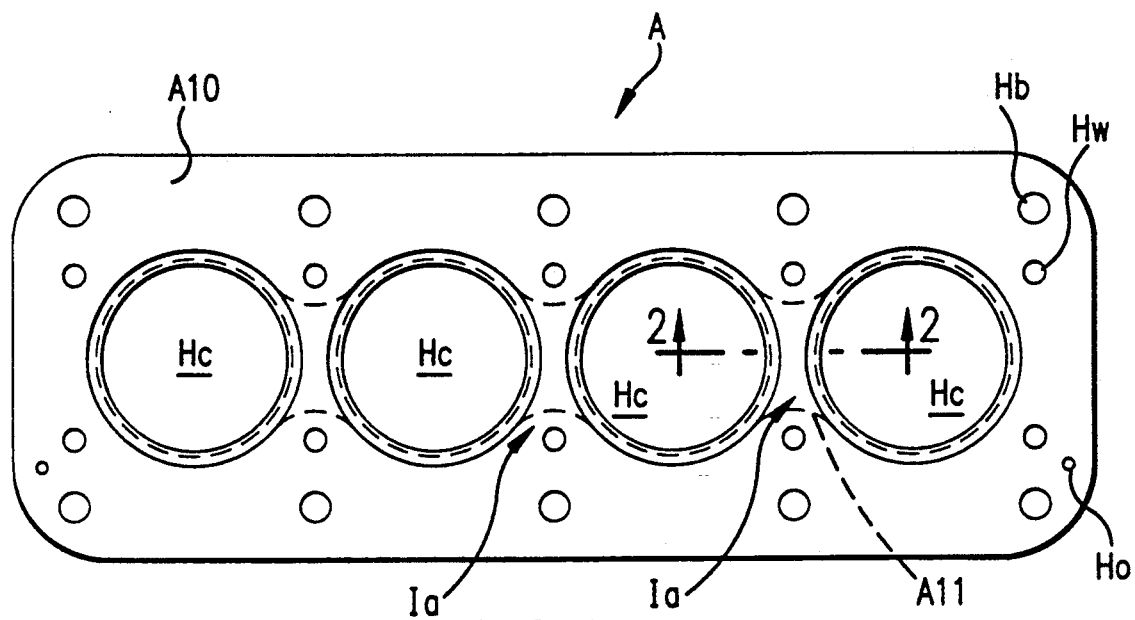
FIG. 1 is a plan view of a first embodiment of a cylinder head gasket of the invention.
Figure 2:
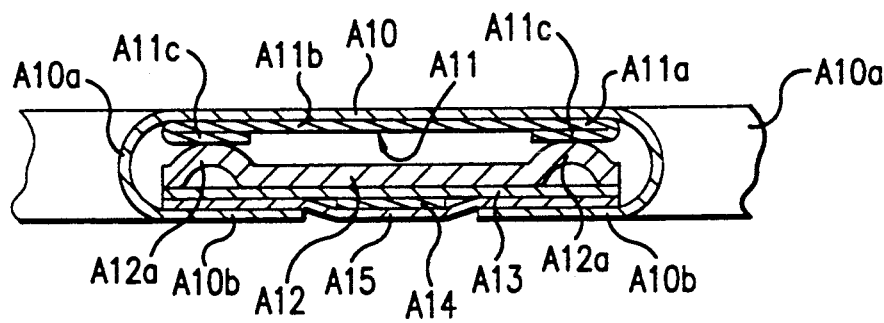
FIG. 2 is an enlarged section view taken along a line 2—2 in FIG. 1.
Figure 3:
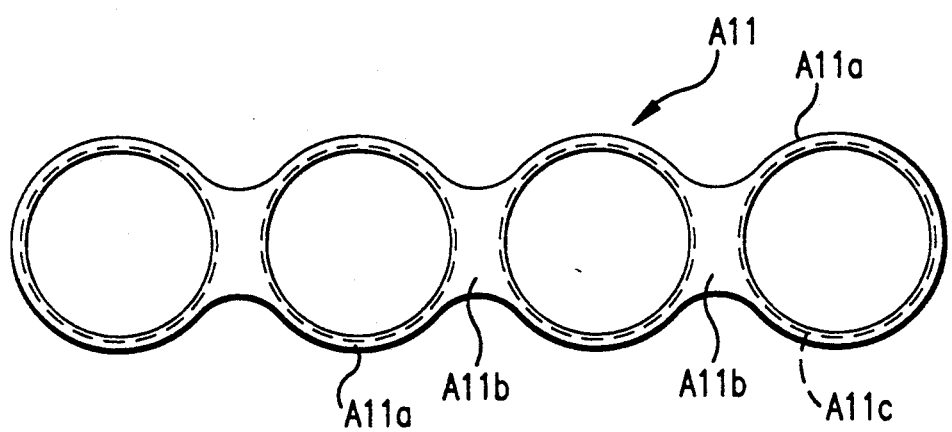
FIG. 3 is a plan view of an auxiliary plate used in the first embodiment of the invention.

Referring to FIGS. 1-3, a first embodiment A of a cylinder head gasket of the present invention is shown. The gasket A is a steel laminate gasket and includes a plurality of cylinder bores Hc, water holes Hw, oil holes Ho and bolt holes Hb, as in the conventional gasket. Intermediate areas Ia are defined between the two cylinder bores Hc.

In an engine where the gasket A is installed, high temperature and high pressure are formed in the cylinder bores Hc. Further, the distance between the two cylinder bores Hc is made relatively narrow.

In the invention, the subject matter resides in sealing around the cylinder bores Hc. Therefore, sealing devices around the water holes Hw, oil holes Ho and so on are not explained. Any sealing devices may be used for sealing around the holes other than the cylinder bores Hc.

As clearly shown in FIG. 2, the gasket A is formed of an upper plate A10, an auxiliary plate A11, three middle plates A12, A13, A14 and a lower plate A15. The upper plate A10, the middle plates A12, A13, A14 and the lower plate A15 substantially extend throughout the entire area of the gasket A.

The upper plate A10 includes curved portions A10$a$ around the cylinder bores Hc, and flanges A10$b$ situated under the lower plate A15. The middle plate A12 includes beads A12$a$ around the cylinder bores Hc. When the gasket A is tightened, the beads A12$a$ are compressed to seal around the cylinders bore Hc.

The middle plate A13 is a plate for regulating the entire thickness of the gasket A. The middle plate A14 substantially extends throughout the entire area of the gasket, but at the intermediate area Ia, the middle plate A14 is made narrow not to laminate over the flanges A10$b$ to adjust height of the gasket at the flanges A10$b$. The lower plate A15 is situated under the middle plate A14, but the flanges A10$b$ are located outside the lower plate A15.

The auxiliary plate A11 is formed of annular edge portions A11$a$ around the cylinder bores Hc, base or connecting portions A11$b$ between the two edge portions A11$a$, and turning portions A11$c$ located under the edge portions A11$a$. The turning portions A11$c$ thicken the edge portions A11$a$ around the cylinder bores. The edge portions A11$a$, connecting portions A11$b$ and turning portions A11$c$ are integrally formed together as one unit.

The auxiliary plate A11 is made of hard metal and is made thinner than other plates. Preferably, the thickness of the auxiliary plate A11 is between 0.02 and 0.15 mm.

When the auxiliary plate A11 is assembled with other plates, the auxiliary plate A11 is situated above the middle plate A12 such that the turning portions A11$c$ are located above the beads A12$a$. The connecting portions A11$b$ are located at the intermediate portions Ia between the cylinder bores Hc.

When the gasket A thus assembled is situated between a cylinder head and a cylinder block (both not shown) and is tightened, the beads A12$a$ are compressed to provide surface pressure to seal around the cylinder bores Hc. Since the auxiliary plate A11 is located around the cylinder bores and the intermediate portions Ia, these portions become thick. Further, since the turning portions A11$c$ are located around the cylinder bores, high surface pressure is formed around the cylinder bores Hc when the gasket is tightened. Therefore, the areas around the cylinder bores Hc are tightly sealed.

In the gasket A, the intermediate portions Ia are narrow. Therefore, high pressure and high temperature are applied to the intermediate portions Ia from the cylinder bores Hc. However, since the edge portions A11$a$ and the turning portions A11$c$ are located above the beads A12$a$, the beads A12$a$ can be tightened very strongly. Accordingly, leakage of gas from the intermediate portions Ia is substantially, prevented.

In the gasket A, since the auxiliary plate A11 is installed around the cylinder bores, the area around the cylinder bores can be securely sealed. Even if high combustion pressure is formed inside the cylinder bores Hc, such pressure does not leak through the gasket A.

Figure 4:
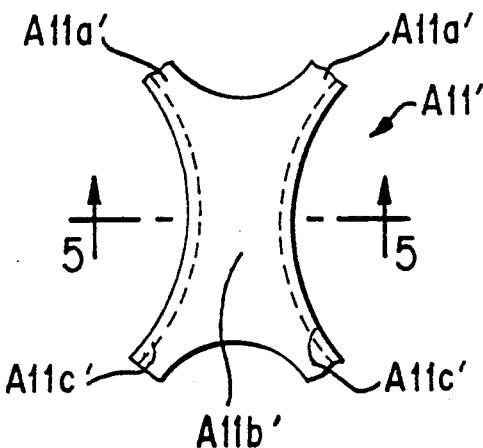
FIG. 4 is an enlarged plan view of an auxiliary plate different from that shown in FIG. 3.
Figure 5:
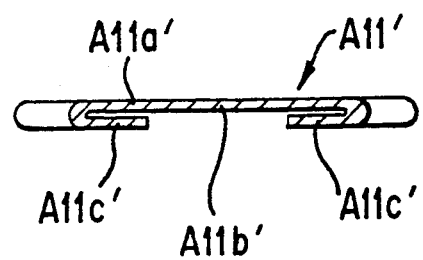
FIG. 5 is a section view taken along a ling 5—5 in FIG. 4.

FIGS. 4 and 5 shows an auxiliary plate A11' different from the auxiliary plate A11. The auxiliary plate A11' is formed of two curved edge portions A11$a$', a base or connection portion A11$b$' and two turning portions A11$c$' situated under the edge portions A11$a$'. The curved edge portions A11$a$' and the turning portions A11$c$' curve partially along the cylinder bores without entirely surrounding the cylinder bores.

In case a gasket is required to have strong surface pressure only at the intermediate areas Ia, the auxiliary plates A11' are installed at the intermediate areas Ia instead of the auxiliary plate A11. If required, the auxiliary plates A11' may be laminated over the auxiliary plate A11.

Figure 6:
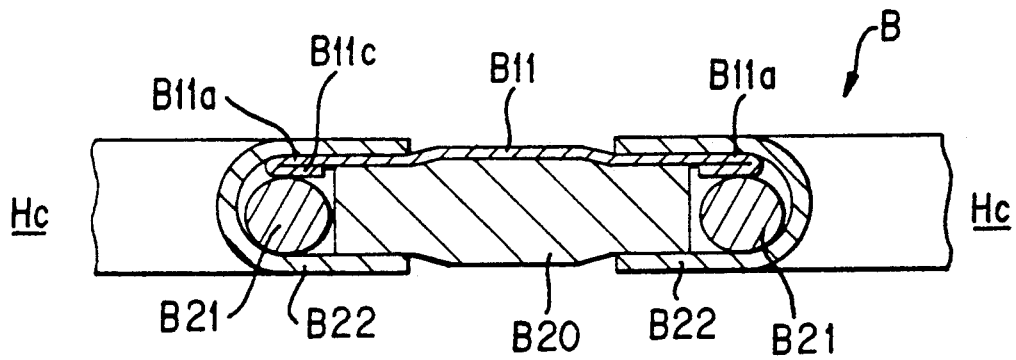
FIGS. 6 and 7 are section views, similar to FIG. 2, for showing second and third embodiments of the invention.

FIG. 6 shows a second embodiment B of a cylinder head gasket of the invention. The gasket B comprises a main plate B20 extending substantially throughout the entire area of the engine, wire rings B21 situated around the cylinder bores Hc, grommets B22 situated over the wire rings B21 around the cylinder bores Hc, and an auxiliary plate B11 with edge portions B11$a$ and turning portions B11$c$.

The main plate B20 is made of a gasket material, such as a mixture of carbon or inorganic fibers and a binder. The auxiliary plate B11 is the same as the auxiliary plate A11. In the gasket B, the edge portions B11$a$ and the turning portions B11$c$ of the auxiliary plate B11 are located above the wire rings B21.

When the gasket B is tightened, the intermediate area Ia and the wire rings B21 are compressed by the auxiliary plate B11. Especially, the wire rings B21 are strongly compressed by the edge portions B11$a$ and the turning portions B11$c$. Therefore, the sealing around the cylinder bores is improved.

Figure 7:
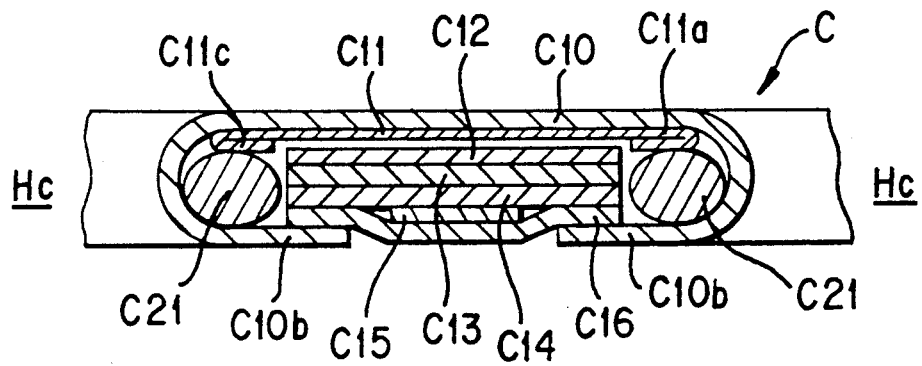

FIG. 7 shows a third embodiment C of a cylinder head gasket of the invention. The gasket C comprises an upper plate C10 with flanges C10$b$, an auxiliary plate C11 with edge portions C11$a$ and turning portions C11$c$, four middle plates C12, C13, C14, C15, and a lower plate C16, similar to the gasket A. However, the gasket C includes wire rings C21 instead of the bead A12$a$.

The edge portions C11$a$ and the turning portions C11$c$ are located above the wire rings C21. Therefore, when the gasket C is tightened, the areas around the cylinder bores Hc are strongly compressed to prevent leakage of gas. The gasket C operates as in the gasket A.

In the present invention, an auxiliary plate having edge portions, connecting portions and turning portions is laminated over a main plate, and the edge portions and the turning portions are located above the sealing means of the cylinder bores. Therefore, when the gasket is tightened, the sealing means is strongly compressed. Therefore, leakage of gas from the cylinder bores is substantially prevented.

While the invention has been explained with reference to the specific embodiments of the invention, the explanation is illustrative and the invention is limited only by the appended claims.

What is claimed is:

1. A cylinder head gasket for an internal combustion engine having a plurality of cylinder bores therein, comprising, a main plate extending substantially throughout an entire area of the engine, said main plate being formed of a metal plate and having a plurality of holes corresponding to the cylinder bores of the engine and at least one intermediate area surrounded between the holes situated adjacent to each other, a first metal plate situated under the main plate for constituting a steel laminate gasket, sealing means formed around the cylinder bores for sealing therearound, and an auxiliary plate situated between the main plate and the first metal plate and laminated only at said at least one intermediate area and around the holes of the main plate without extending throughout the entire area of the engine, said auxiliary plate having edge portions extending only around the respective cylinder bores, at least one base portion extending between the edge portions at the intermediate area, and turning portions laminated over the respective edge portions to abut thereto, said turning portions extending along the respective edge portions and being disposed over the sealing means so that when the gasket is tightened, the edge portions and the turning portions provide high surface pressure around the cylinder bores to thereby prevent gas leakage around the entire cylinder bores.

2. A cylinder head gasket according to claim 1, wherein said main plate includes curved portions formed around the respective cylinder bores to define the holes, and flanges formed around the respective cylinder bores to extend from the respective curved portions in the direction away from the respective cylinder bores.

3. A cylinder head gasket according to claim 2, further comprising a second metal plate situated between the main plate and the first metal plate, said second metal plate having beads around the cylinder bores, said turning portions and said edge portions being located over the beads, said beads forming the sealing means.

4. A cylinder head gasket according to claim 2, wherein said sealing means are wire rings situated around the curved portions outside the cylinder bores, said turning portions and said edge portions being located over the wire rings.

5. A cylinder head gasket according to claim 1, wherein said auxiliary plate is made of hard metal and is made thinner than the main plate.

6. A cylinder head gasket for an internal combustion engine having a plurality of cylinder bores therein, comprising, a main plate extending substantially throughout an entire area of the engine, said main plate having a plurality of holes corresponding to the cylinder bores of the engine and at least one intermediate area surrounded between the holes situated adjacent to each other, sealing means formed around the cylinder bores for sealing therearound, and at least one auxiliary plate laminated at said at least one intermediate area of the main plate without extending throughout the entire area of the engine, said auxiliary plate having two edge portions extending partly along the respective cylinder bores adjacent the intermediate area, a base portion extending between the two edge portions at the intermediate area, and two turning portions laminated over the respective edge portions to abut thereto, said turning portions extending along the respective edge portions and being disposed over the sealing means so that when the gasket is tightened, the edge portions and the turning portions provide high surface pressure around the cylinder bores at the intermediate area to thereby prevent gas leakage at the intermediate area.

7. A cylinder head gasket according to claim 6, wherein said auxiliary plate is made of hard metal and is made thinner than the main plate.

* * * * *